UNITED STATES PATENT OFFICE.

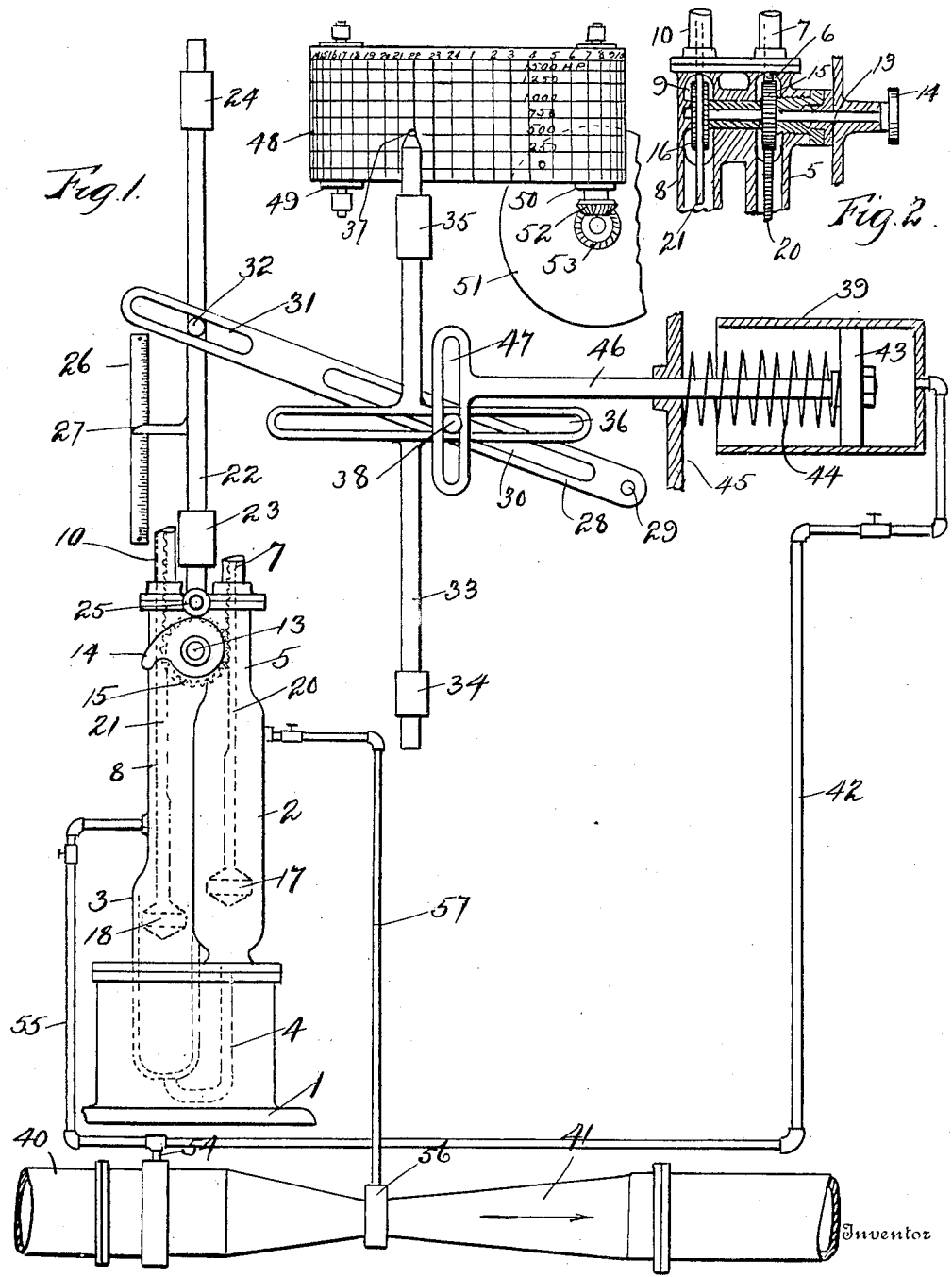

FREDERICK N. CONNET, OF PROVIDENCE, RHODE ISLAND.

DYNAMOMETER.

No. 931,274.    Specification of Letters Patent.    Patented Aug. 17, 1909.

Application filed April 8, 1907. Serial No. 366,938.

*To all whom it may concern:*

Be it known that I, FREDERICK N. CONNET, a citizen of the United States, residing at the city of Providence, in the county of Providence and State of Rhode Island, have invented certain new and useful Improvements in Dynamometers, of which the following is a specification, reference being had therein to the accompanying drawing.

This invention relates to dynamometers and has for its object to provide a simple and practical instrument for indicating and automatically recording the horse power of liquids or gases flowing through a supply pipe, said instrument being controlled in its action by the pressure in said pipe, and also by the volume passing therethrough.

In carrying out my invention any means may be used for determining the volume passing through said pipe, but I preferably employ a pipe or tube inserted into the main supply pipe, said tube being similar in construction to what is commonly known as the "Venturi tube", described in the United States Patent No. 381,373, April 17, 1888, and in order to obtain the volume or quantity passing through said tube I have connected two chambers thereto, one communicating with the up-stream or high pressure side of the tube and the second communicating with the throat or reduced pressure portion of the same. In these chambers floats are located whereby the difference between the pressures at the two points are arranged to operate mechanism to indicate the volume or quantity flowing therethrough. In determining the pressure in said pipe any convenient means may be used, but for simplicity I have illustrated a cylinder connected to the said main supply pipe whereby a piston in said cylinder is actuated by the working pressure in the pipe to co-act with the quantity indicating mechanism, whereby the combined movement of both operates other mechanism to record the horse power of the liquids or gases passing through said supply pipe.

This invention is fully set forth in this specification and more particularly pointed out in the appended claims.

In the drawings: Figure 1—is a diagrammatic view illustrating one form of mechanism whereby the resultant effect of the pressure and quantity are obtained to indicate the horse power. Fig. 2—is a detail in section, showing the arrangement of racks and gears through which the two floats operate to move the actuating cam.

The following is a detail description of one form of mechanism that may be employed to determine the quantity passing through the tube.

Referring to the drawings, at 1 is the base of the frame on which is supported a pair of cylinders 2 and 3, the former being set somewhat higher than the latter cylinder. These cylinders are connected together at their lower ends by the pipe 4. The upper end of cylinder 2 is provided with a short neck 5 communicating with the central opening 6, see Fig. 2, and the standpipe 7, and extends upward from said opening in line with said neck making the whole cylinder self-contained and water-tight. The cylinder 3 is connected with a longer neck 8 and also communicates with a circular chamber 9, corresponding to and in line horizontally with said chamber 6, and a stand-pipe 10 extends upward from the opening 9 in line with its neck 8 making this cylinder also tight against the pressure of water At 13 is a horizontal shaft extending from the circular chamber 9 through the circular chamber 6 and into a record casing not shown, the actuating cam 14 being mounted on its end. A gear 15 located in chamber 6 is mounted on and fixed to this shaft, and a similar gear 16 located in chamber 9 is also mounted and fixed to this same shaft. At 17 and 18 are two floats adapted to rest on and be moved vertically by the change in the level of the mercury in both of the cylinders. To the upper end of float 17 is connected a long rack 20 adapted to engage one side of the gear 15, while to the float 18 is also connected a similar rack 21 adapted to engage the opposite side of the gear 16. When either of the floats is way up the rack extends into its standpipe and when the float is way down the bottom of the same rests upon the lower end of its center.

At 22 I have shown an upright bar adapted to be moved in its bearings 23 and 24 by said cam 14 through the contact wheel 25, and at 26 is a scale over which the finger 27 passes to indicate the quantity passing through the tube by any convenient unit of measure.

At 28 is an inclined bar pivoted at its lower end at 29, said bar being slotted at 30 for the greater portion of its length and also at its upper end 31, through which latter slot the pin 32, which is fixed to the bar 22, passes.

At 33 is a bar held to slide vertically in its bearings 34 and 35. This bar is provided near its central portion with a transverse elongated slotted portion 36, and at its upper end is held the tracing pen 37. A floating pin 38 is passed loosely through the slot 30 and 36.

In order to obtain the effect of the pressure in the supply pipe a horizontal cylinder 39 is provided, the same being connected to the supply pipe 40 on the up stream side of the Venturi tube 41, through the pipe 42. A piston 43 is held to reciprocate in this cylinder, and is arranged to act against the balance spring 44, the outer end of said spring abutting against the fixed wall 45. This piston is provided with a rod 46 on the outer end of which is a cross-bar provided with an elongated slot 47 which slotted portion also engages the above-mentioned floating pin 38. At 48 is a continuously moving chart which is adapted to be unwound from one roll 49 and wound onto a corresponding roll 50 by means of clock mechanism, not shown, in the casing 51, through the gears 52 and 53. The vertical lines on this chart represent the twenty-four hours of the day, while the distance between the horizontal lines thereon may represent any predetermined number of horse power.

In the operation of this device the liquids or gases flow through the tube 41 in the direction indicated by the arrow. The upstream side of the tube is connected at 54 by means of pipe 55 to the cylinder 3, while the throat is connected at 56 by the pipe 57 to the cylinder 2. When there is no flow through the tube the pressure at all points of the tube is, of course, equal, and the floats in both cylinders are at the same height, the quantity mechanism standing at zero. As soon as the flow begins the pressure in the throat is decreased and becomes less than that at the point 54, therefore the mercury in chamber 3 is forced downward by the excess of pressure on this side, raising the mercury and float in the opposite chambers a corresponding amount. As these floats move one up and one down they act with corresponding force through their respective racks and gears on the shaft 13 to rotate the actuating cam 14 in proportion to their movement. The greater the velocity of flow through the tube the greater the difference at these two points and consequently the greater the movement of the cam 14. The rotation of this cam serves to move the bar 32 an amount in proportion to the quantity passing through the tube which quantity may also be indicated by the finger 27 on the scale 25.

The vertical movement of the bar 22 is arranged to also give a proportional vertical movement to the tracer bar 33 through the inclined bar 28 and floating pin 38. In figuring the horse power of flowing liquids or gases it is necessary that the quantity be multiplied by the pressure, the bar 22 representing the quantity, and the piston 32 working in the cylinder 39 representing the pressure, the mechanism being so arranged that an outward movement of the piston actuated by the pressure, co-acts with the movement of the quantity bar to again raise the tracer by sliding the floating pin farther upward in the slot 30 of the inclined bar, whereby the resultant effect of these two forces move the tracer over the chart to correctly indicate the horse power of the fluid passing through the supply pipe.

The principle of my dynamometer or horse power recording device is represented by a diagrammatic view in the simplest possible form, but I do not restrict myself to the construction and arrangement of parts shown and described nor to the various details thereof, as any arrangement of mechanism for automatically indicating the horse power of flowing liquids or gases through a conductor by a single rectilinear motion of a recording arm will come within the spirit and scope of my invention, one practical arrangement of which has been herein illustrated and described without attempting to show all of the various forms and modifications in which my invention might be embodied.

Having thus described my invention what I claim as new and desire to secure by Letters Patent, is:

1. A dynamometer comprising a movable member, means operated by the differences between pressures at two points in a supply main for moving said member, a pivoted bar loosely connected at one end to said member, a movable rod, means actuated in proportion to the pressure in said pipe for moving said rod, an indicating member, and a single means for providing a shifting connection between said pivoted bar and said rod, and also between said bar and said indicating member.

2. A dynamometer comprising a movable member, means operated by the difference between pressures at two points in a supply main for moving said member, a pivoted bar loosely connected at one end to said member, an indicator member operatively connected with said bar, a movable rod, means actuated in proportion to the pressure in said main for moving said rod, and means for providing a shifting connection between said rod and bar.

3. A dynamometer comprising a movable member, means operated by the difference between pressures at two points in a supply main for moving said member, a pivoted bar loosely connected at one end to said member, said bar being slotted, a floating pin mounted in the slot of said bar, an indicator member operatively connected with said bar, a movable rod, and means actuated in proportion to the pressure in said main for actuating said rod, said rod engaging said pin.

4. A dynamometer comprising a movable member, means operated by the difference between the pressures at two points in a supply main for moving said member, a pivoted bar loosely connected at one end to said member and provided with a slot, a floating pin mounted in said slot, an indicator member connected to said pin, a movable rod, and means actuated in proportion to the pressure in said main for moving said rod, said rod also engaging said pin.

5. A dynamometer comprising a movable member, means operated by the difference in pressure between two points in a supply main for moving said member, a pivoted bar loosely connected at one end to said member and provided with a slot, an indicator member operatively connected with said bar, a floating pin mounted in said slot, a movable rod, and means actuated in proportion to the pressure in said main for moving said rod, said rod being provided with a slot engaging said floating pin.

6. A dynamometer comprising a movable member, means operated by the difference between pressures at two points in a supply main for moving said member, a pivoted bar loosely connected at one end to said member and provided with a slot, a floating pin mounted in said slot, an indicator member provided with a slot engaging said pin, a movable rod, and means actuated in proportion to the pressure in said pipe for moving said rod, said rod being provided with a slot also engaging said floating pin.

7. A dynamometer comprising a movable member, means operated by the difference between pressures at two points in a supply main for moving said member, a pivoted bar loosely connected at one end to said member and provided with a slot, a floating pin mounted in said slot, an indicator member provided with a slot engaging said pin, a movable rod, and means actuated in proportion to the pressure in said main for moving said rod, said rod being provided with a slot also engaging said floating pin, the slots of said rod and said indicator member being arranged at right angles to each other.

8. In a dynamometer, the combination of a main supply pipe, a rotatable cam, means for operating said cam, said operating means being controlled by the difference between the pressures at two points in said pipe, a movable member having one end in engagement with said cam, pressure controlled means actuated in proportion to the pressure in said pipe, and indicating means operatively connected with said member and said pressure controlled means, whereby said indicating means is operated through the combined action of said member and said pressure actuated means.

9. In a dynamometer, the combination of a main supply pipe, a cam, means including a float for operating said cam in accordance with the difference between the pressures at two points in said pipe, a movable member operated by said cam, pressure controlled means actuated in proportion to the pressure in said pipe, an indicator member, and means operatively connecting said indicator member with said movable member and said pressure controlled means, whereby said indicator member is given a single rectilinear motion through the combined action of said member and said pressure actuated means.

10. In a dynamometer, the combination of a main supply pipe, a rotatable cam, means for operating said cam, said operating means being controlled by the difference in pressure at two points in said pipe, a member having one end in engagement with said cam, pressure controlled means actuated in proportion to the pressure in said pipe, a tracer member operatively connected with said member and said pressure controlled means, whereby said tracer member is operated through the combined action of said member and said pressure actuated means, and means for feeding a record sheet in operative relation to said tracer.

11. A dynamometer comprising a cam, means for operating said cam controlled by the difference between the pressures at two points in a supply main, a member actuated by said cam, a pivoted bar operatively connected with said member, a movable rod, means operated in proportion to the pressure in said main for moving said rod, an indicator member, and means for providing a shifting connection between said pivoted bar and said rod, and also between said bar and said indicator member.

12. A dynamometer comprising a cam, means for operating said cam, said means including floats controlled by the difference between pressures at two points in a supply main, a member actuated by said cam, a pivoted bar operatively connected with said member, a movable rod, means operated in proportion to the pressure in said main for moving said rod, an indicator member, and means for providing a shifting connection between said pivoted bar and said rod, and also between said bar and said indicator member.

In testimony whereof I affix my signature in presence of two witnesses.

FREDERICK N. CONNET.

Witnesses:
HOWARD E. BARLOW,
E. I. OGDEN.